United States Patent
Thom et al.

(10) Patent No.: US 11,658,930 B2
(45) Date of Patent: *May 23, 2023

(54) PERSONALIZED DASHBOARD CHART FOR EMAIL SUBSCRIPTIONS

(71) Applicant: salesforce.com, inc., San Francisco, CA (US)

(72) Inventors: Dylan Thom, San Francisco, CA (US); Ryoji Osawa, San Francisco, CA (US); Pragya Anand, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,498

(22) Filed: Jun. 28, 2022

(65) Prior Publication Data
US 2022/0329559 A1      Oct. 13, 2022

Related U.S. Application Data

(63) Continuation of application No. 17/301,709, filed on Apr. 12, 2021, now Pat. No. 11,418,473, which is a
(Continued)

(51) Int. Cl.
| | | |
|---|---|---|
| G06F 15/16 | (2006.01) |
| H04L 51/42 | (2022.01) |
| H04L 51/066 | (2022.01) |
| H04L 51/046 | (2022.01) |
| H04L 41/22 | (2022.01) |
| G06Q 10/107 | (2023.01) |
| G06Q 10/0639 | (2023.01) |
| H04L 51/212 | (2022.01) |
| H04L 51/214 | (2022.01) |

(52) U.S. Cl.
CPC ....... *H04L 51/42* (2022.05); *G06Q 10/06393* (2013.01); *G06Q 10/107* (2013.01); *H04L 41/22* (2013.01); *H04L 51/046* (2013.01); *H04L 51/066* (2013.01); *H04L 51/212* (2022.05); *H04L 51/214* (2022.05)

(58) Field of Classification Search
CPC ....... H04L 51/22; H04L 41/22; H04L 51/046; H04L 51/066; H04L 51/12; H04L 51/14; G06Q 10/0639; G06Q 10/107
USPC .................................................. 709/206, 207
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

*Primary Examiner* — Liang Che A Wang
(74) *Attorney, Agent, or Firm* — LKGlobal | Lorenz & Kopf, LLP

(57) ABSTRACT

A method for managing a user's email subscriptions has been developed. The method provides a user interface (UI) to the user that allows the user to view and select multiple stand-alone components across multiple dashboard displays for an email subscription to an email address. The user's selections are received via the UI. A display of each of the subscribed stand-alone components is rendered periodically based on the user's preference. The rendered displays are combined into a single email message that is sent to the email address upon completion of the rendering of the displays.

17 Claims, 8 Drawing Sheets

Related U.S. Application Data continuation of application No. 16/826,978, filed on Mar. 23, 2020, now Pat. No. 11,005,801.

(60) Provisional application No. 62/968,797, filed on Jan. 31, 2020.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,620,690 B1* | 11/2009 | Castelli | G06Q 10/107 709/206 |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,521,733 B1* | 8/2013 | Patekar | G06F 16/2457 707/732 |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2007/0055439 A1* | 3/2007 | Denker | G06Q 30/02 701/532 |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |

(56) References Cited

U.S. PATENT DOCUMENTS

| | | | |
|---|---|---|---|
| 2009/0299802 A1* | 12/2009 | Brennan | G06Q 10/0635 |
| | | | 707/999.107 |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2015/0256499 A1* | 9/2015 | Kumar | G06Q 10/107 |
| | | | 707/755 |
| 2015/0332422 A1* | 11/2015 | Gilmartin | G06Q 10/10 |
| | | | 705/2 |
| 2016/0104363 A1* | 4/2016 | Dorfstatter | H04N 7/18 |
| | | | 348/143 |
| 2019/0089844 A1* | 3/2019 | Sharma | H04M 15/8027 |
| 2020/0293568 A1* | 9/2020 | Lu | G06Q 30/0255 |

\* cited by examiner

FIG. 2

PERSONALIZED DASHBOARD CHART FOR EMAIL SUBSCRIPTIONS

CROSS-REFERENCE TO RELATED APPLICATION(S)

This application claims the benefit of U.S. patent application Ser. No. 17/301,709, filed Apr. 12, 2021, titled "PERSONALIZED DASHBOARD CHART FOR EMAIL SUBSCRIPTIONS"; which claims the benefit of U.S. Pat. No. 11,005,801 filed Mar. 23, 2020, titled "PERSONALIZED DASHBOARD CHART FOR EMAIL SUBSCRIPTIONS"; which claims the benefit of U.S. Provisional Patent App. No. 62/968,797, filed Jan. 31, 2020, titled "PERSONALIZED DASHBOARD CHART FOR EMAIL SUBSCRIPTIONS".

TECHNICAL FIELD

Embodiments of the subject matter described herein relate generally to electronic mail (email) protocols. More particularly, embodiments of the subject matter relate to a personalized dashboard chart for email subscriptions.

BACKGROUND

Analytical data users need to be able to subscribe to the metrics that they care about so that they may receive an overview of top key performance indicators (KPI) delivered when they need it. Accordingly, it is desirable to have an email dashboard that is self-service and interactive where users can filter and make decisions on which KPIs to see. For example, the user can see charts and metrics filtered by their team or region. Users would also like to receive these charts and metrics in email with the selected filters applied. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a display of a user interface to control email subscription settings in accordance with one embodiment;

DETAILED DESCRIPTION

A method and apparatus for managing a user's email subscriptions has been developed. The method provides a user interface (UI) to the user that allows the user to view and select multiple stand-alone components across multiple dashboard displays for an email subscription to an email address. The user's selections are received via the UI and include one or more stand-alone components from a first dashboard display and one or more stand-alone components from a second dashboard display in the email subscription. The first dashboard display is not the same as the second dashboard display. A display of each of the subscribed stand-alone components is rendered periodically based on the user's preference. The rendered displays are combined into a single email message that is sent to the email address upon completion of the rendering of the displays. In some embodiments, the stand-alone components may comprise key performance indicators (KPI) of interest to the user. In other embodiments, the stand-alone components may comprise "widgets". Widgets may be various charts, tables, or textual messages.

Figure 1A:
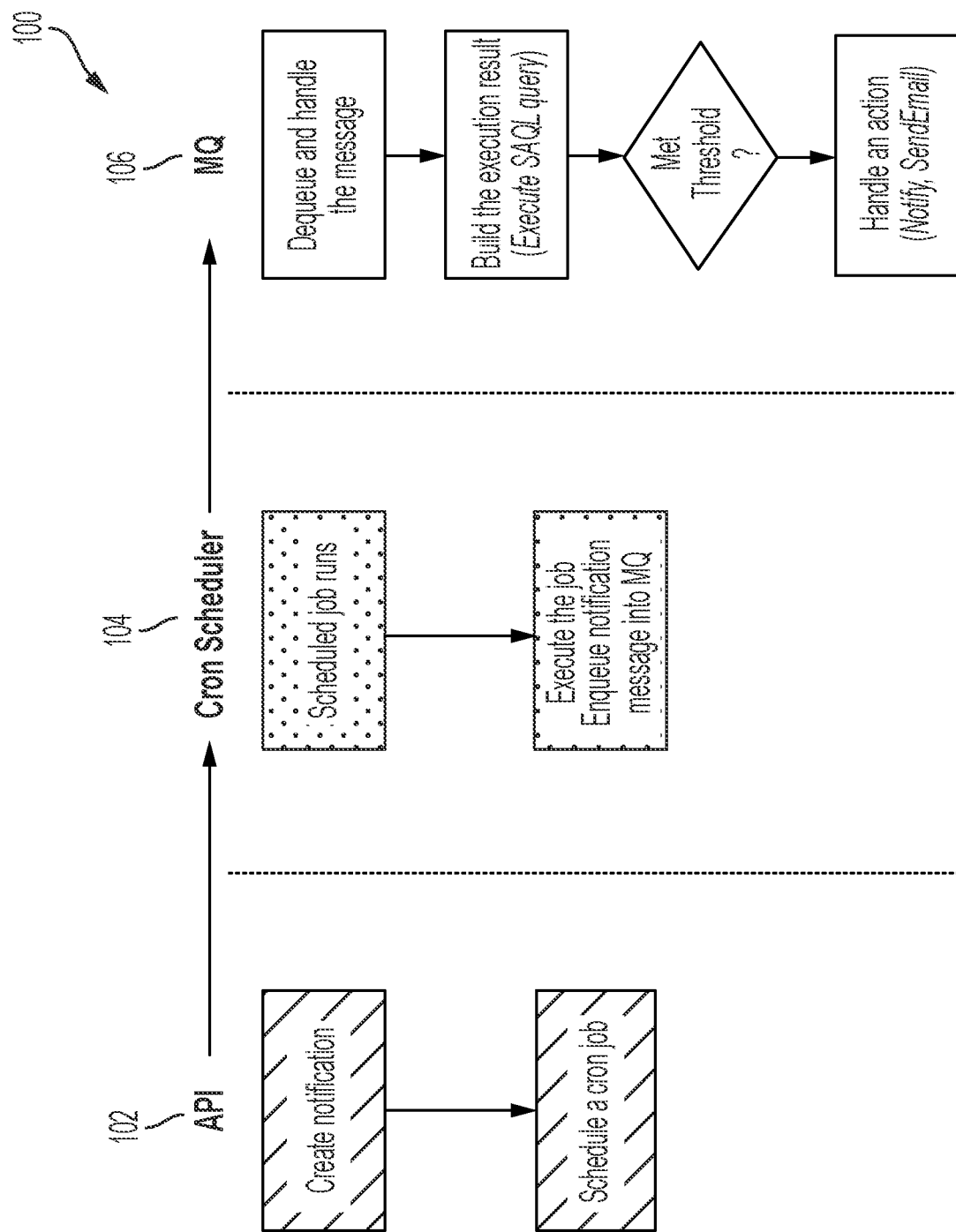
FIG. 1A is a block diagram of an analytics subscription framework in accordance with one embodiment.

Turning now to FIG. 1A, a block diagram is shown of an analytics subscription framework 100 in accordance with one embodiment. In the present embodiment, a notification is created through the analytic subscription application programming interface (API) 102. As part of this, a new Cron job is scheduled for the subscription. When the Cron Scheduler 104 runs the Cron job, a notification message is enqueued into the message queue (MQ) 106. The analytics subscription framework 100 provides several pluggable entry points and a plug-in mechanism that allows implementation of specific requirements or extending the behavior for a certain source types during the execution of a subscription job or its API.

In some embodiments using the standard Analytics Subscription Framework features and its API, the only change needed is to create a new source type. A different source is needed to distinguish it from the existing notification since different implementation requirements are required for a subscription. A new API resource may be created to encapsulate all operations needed to support for subscription, such as creating subscription schedule, creating or deleting subscription widgets. This same API endpoint will also be used to fetch a dashboard snapshot used to show subscription widgets in UI and email preview.

Figure 1B:
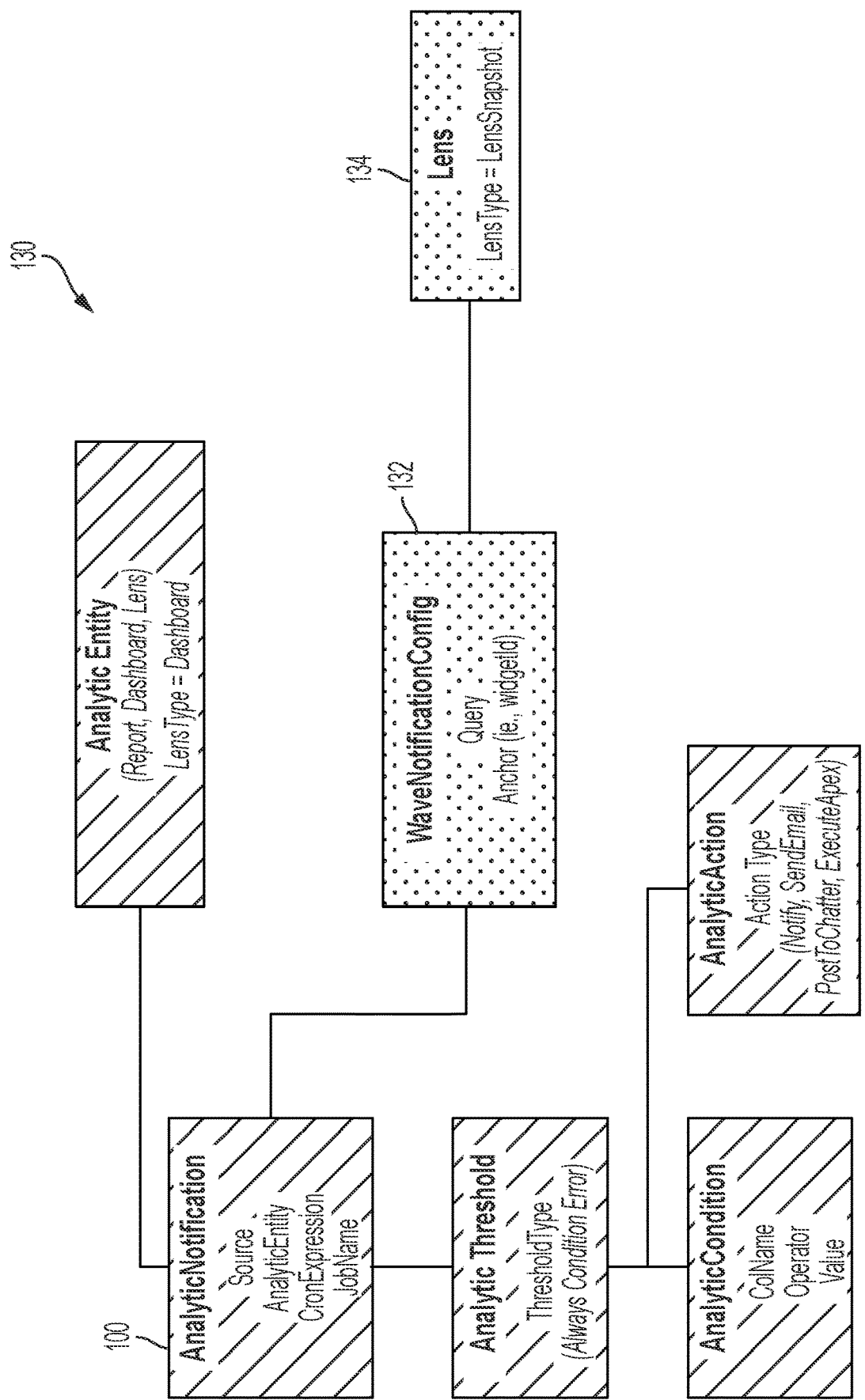
FIG. 1B is a block diagram of an entity diagram of an analytics subscription framework in accordance with one embodiment.

Turning now to FIG. 1B, a block diagram is shown of an entity diagram 130 of an analytics subscription framework 100 in accordance with one embodiment. For the analytic notification, an additional entity called a "WaveNotificationConfig" file 132 is created to parse the information specific to the notification such as an "anchor" (i.e., widget ID), widget type, dimensions and filters. This is also used as a junction table to connect between the analytic subscription network 100 and "Lens" entities 134.

One of the key requirements for management of email subscriptions is to ensure all subscribed widgets scheduled for the same date and time are processed and included in the same subscription email. In one embodiment, extending the current WaveNotificationConfig file is extended to handle this by appending all widgets under the same notification and treating the owner of the subscription as analytic entity.

Also, adding a new field is added to point to the parent dashboard so that the source of the subscription widget may be identified.

Figure 1C:
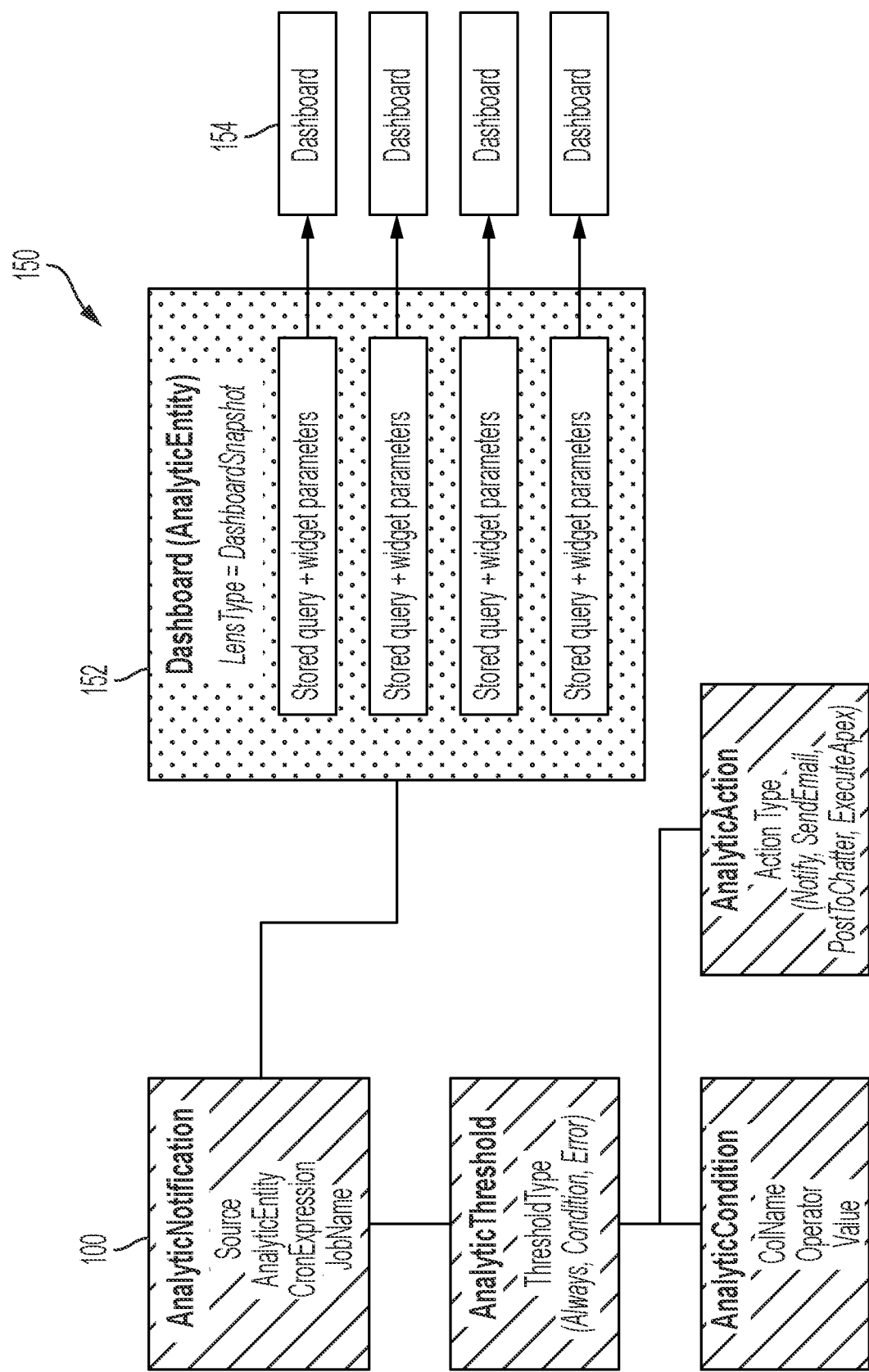
FIG. 1C is a block diagram of a dashboard used to store subscription widgets of an analytics subscription framework in accordance with one embodiment.

Turning now to FIG. 1C, a block diagram 150 of a dashboard 152 used to store all subscription widgets of an analytics subscription framework is shown in accordance with one embodiment. This approach allows easy storage of a collection of stored queries and widget parameters without making any changes to the analytic subscription framework 100. This dashboard 152 is used to store subscription widgets will be saved as a "DashboardSnapshot" lens type and will be linked to the main "AnalyticNotification" object as "AnalyticEntity". A dashboard snapshot 154 is created for each subscription and an update is made whenever the user subscribes to or unsubscribes from a dashboard widget. This embodiment has fully leveraged dashboard features as platform. If new dashboard feature is added, there is no need to use WaveNotificationConfig entity, which is only applicable to Wave Notification source. No special code/handling is needed and there is no need to change Analytics Notification API when adding new fields to subscription widget. In an alternative embodiment, the same snapshot concept used for the WaveNotificationConfig file is applied it to Dashboard 152 so that an actual dashboard is used, but hidden from the users, to store all subscription widgets, rather than through WaveNotificationConfig entity.

The dashboard snapshot 152 used to maintain all subscription widgets will consist of the snapshots of stored queries with widget parameters which copied from user's dashboards. Because of the need to identify which dashboard those widgets were originally made from, a link is stored to those dashboards within dashboard snapshot. The URL used for storage should include at least the following information: dashboard ID; widget ID; savedViewID; and pageID. The dashboardID and widgetID are needed to determine which subscription widgets should be displayed when a user opens subscription panel in a dashboard. The savedViewID and pageID are used to provide deep-linking experience so that the user can directly navigate from their subscription email to their dashboard with the exact state when they created this subscription. Also, the URL stored in this widget parameter should be a sharing URL in order to support mobile applications.

Figure 1D:
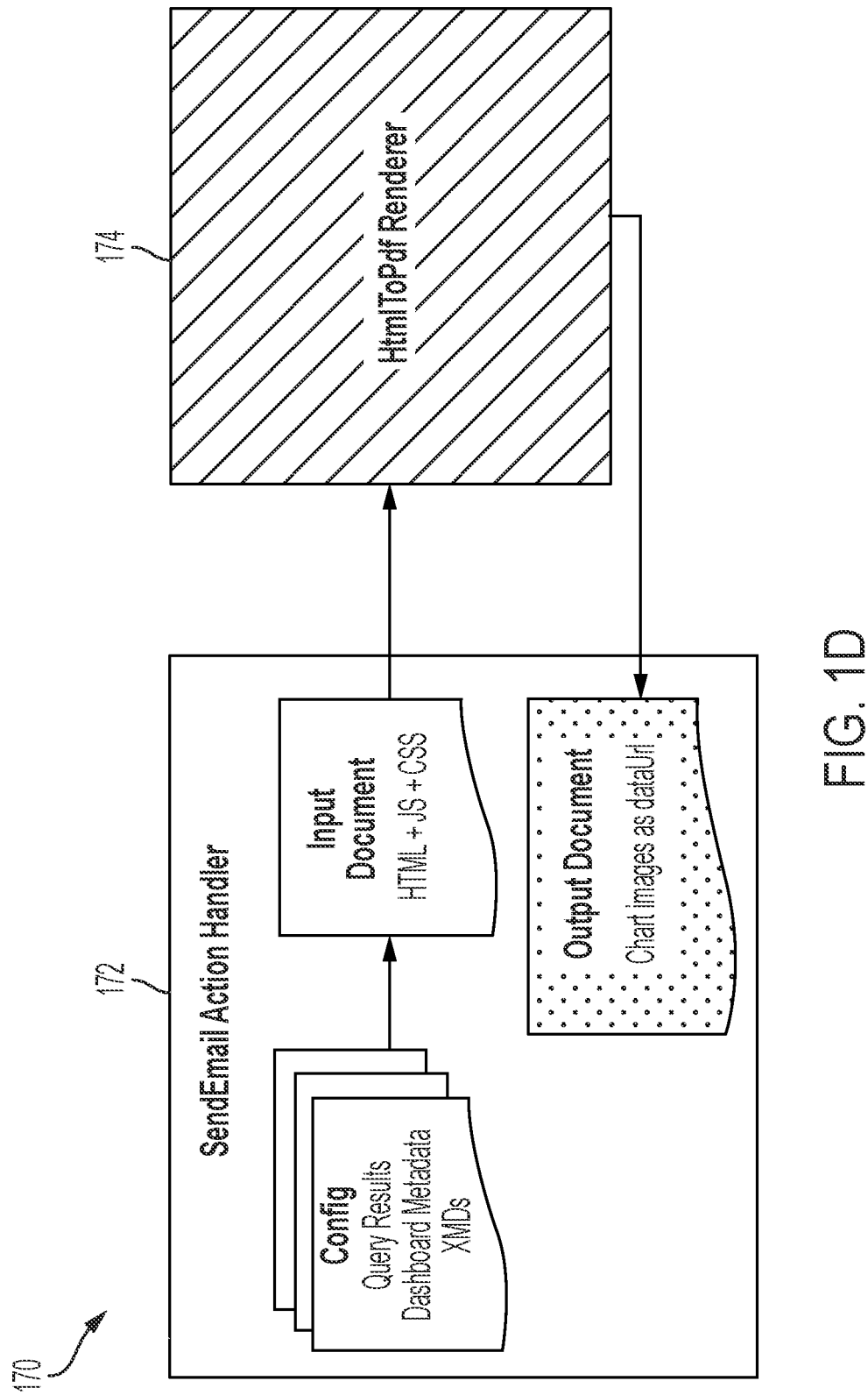
FIG. 1D is a block diagram of an HTML, to PDF renderer in accordance with one embodiment.

Turning now to FIG. 1D, a block diagram 170 of an HTML, to PDF renderer 174 is shown in accordance with one embodiment; In some embodiments, a subscription (Reports and Dashboards) uses HtmlToPdf for rendering of the email content and charts. In some embodiments, the code is executed in headless browser (i.e., without a GUI). Composing an email body will be handled by SendEmail Action Handler 172. All the resources (JS, CSS, data) are included in an input document and fed it into HtmlToPdf. The SendEmail Action Handler 172 and uses the HtmlToPdf Renderer 174 to render the page and retrieve rendered images. This may support all available chart types.

Figure 2:
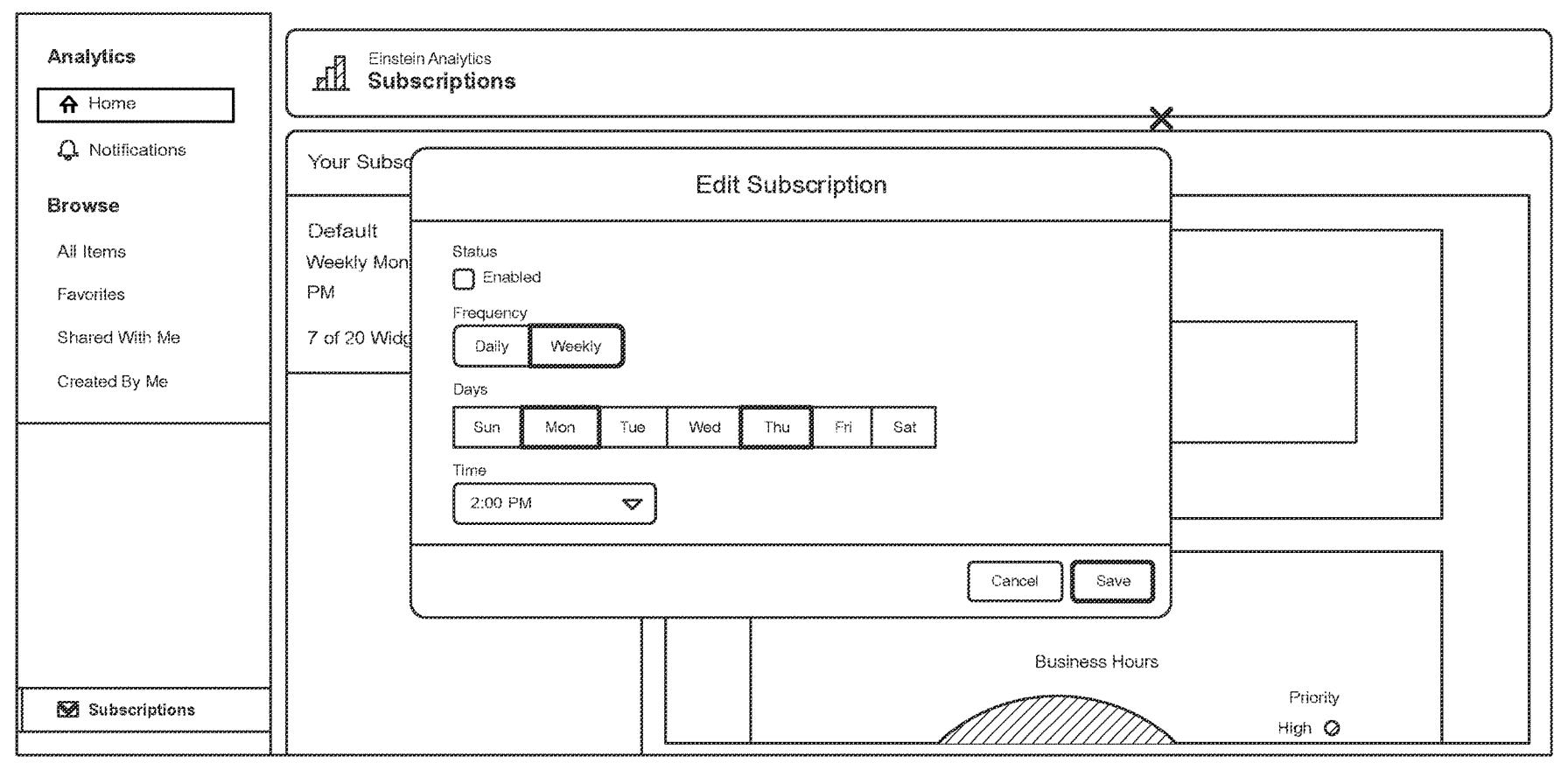

Turning now to FIG. 2, a display is shown of a user interface 200 to control email subscription settings in accordance with one embodiment. The user is required to set up their subscription schedule before subscribing to any of their widgets and selecting a schedule for rendering. This ensures a dashboard snapshot is created before creating their notification object. For scheduling subscription, a new dialogue is launched by clicking "Manage Subscription" link that appears at the top of the panel. Clicking "Save" button performs an update on the notification object for this subscription.

Figure 3:
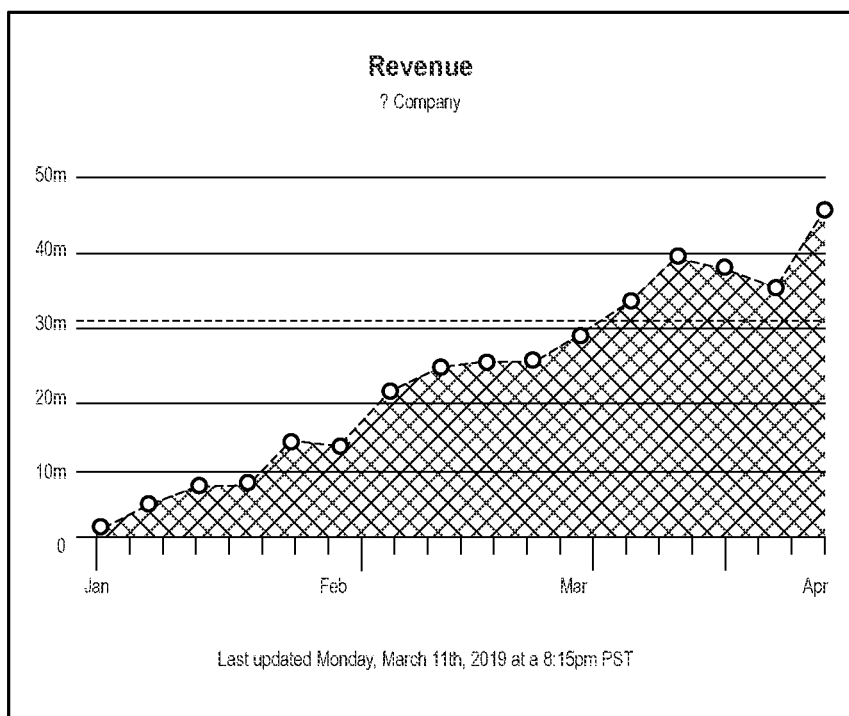
FIG. 3 is a display of a rendered chart in accordance with one embodiment.

The dashboard snapshot should be created with empty state and referenced through Analytic Notification's record ID. Subscribing to a widget requires updating the dashboard snapshot. This be an append operation—constructing a new SAQL step and its associated widget and appending to the dashboard. Unsubscribing will simply remove the specified step and widget from the dashboard snapshot. An XMD file is used to store conditional formatting. As part of creating dashboard snapshot, an asset XMD file is also created for this dashboard, as well. FIG. 3 shows an image 300 of sample subscription email. These rendered chart images may be generated in core using headless browser and may be delivered upon completion of the rendering or based on a user's preference.

Figure 4:
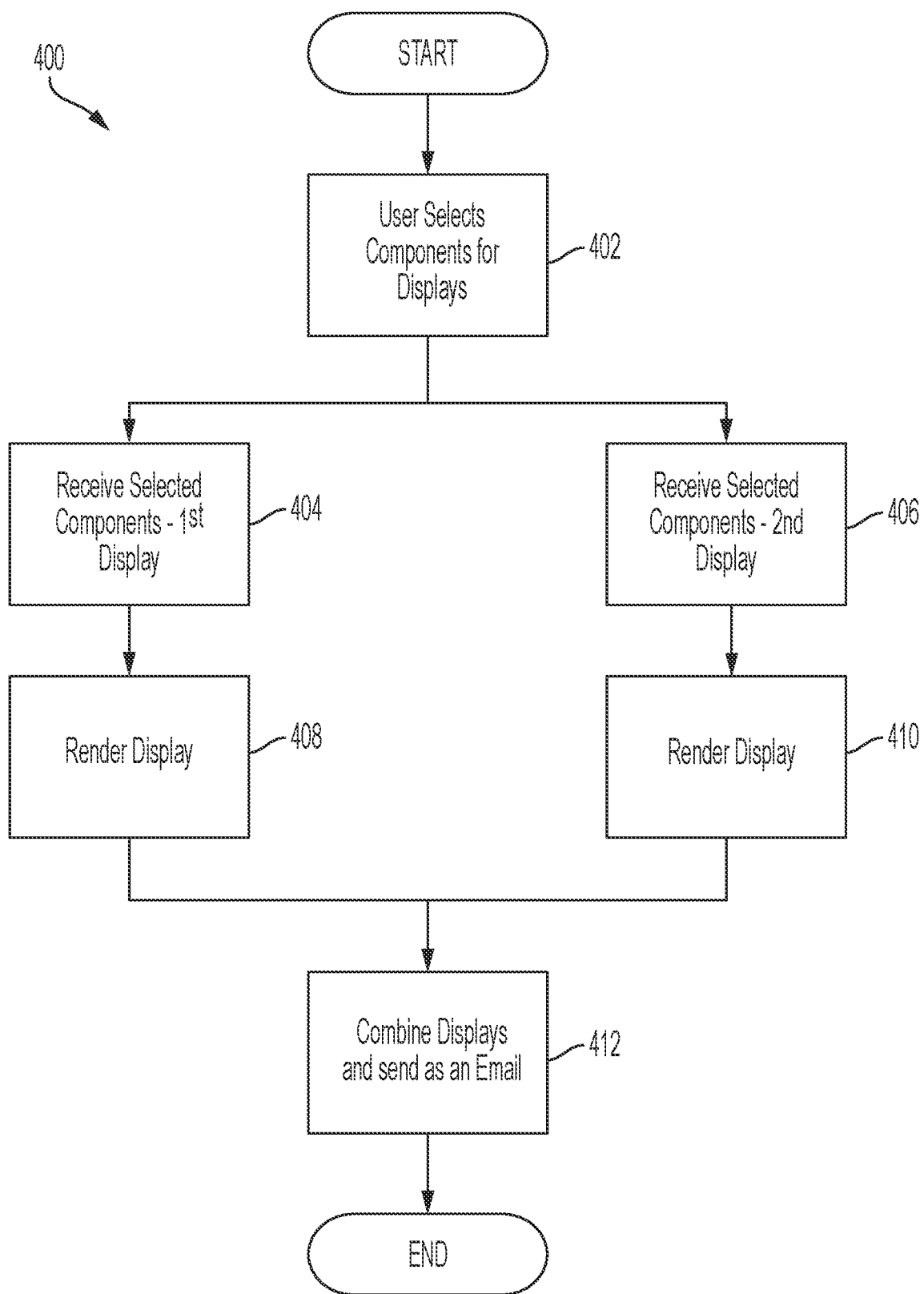
FIG. 4 is a flowchart of a method for managing a user's email subscriptions in accordance with one embodiment.

FIG. 4 is a flowchart 400 of a method for managing a user's email subscriptions in accordance with one embodiment. A UI is provided that allows the user to view and select multiple stand-alone components across multiple dashboard displays for an email subscription to the selected email address 402. The user's selections are received via the UI for a first dashboard display 404. The user selections are also received via the UI for a second dashboard display 406. A display is rendered for each of the selected stand-alone components 408 and 410. The display is rendered periodically based on the user's preferences. Each of the rendered displays are then combined into a single email message that is sent to the email address upon completion of the rendering 412.

Figure 5:
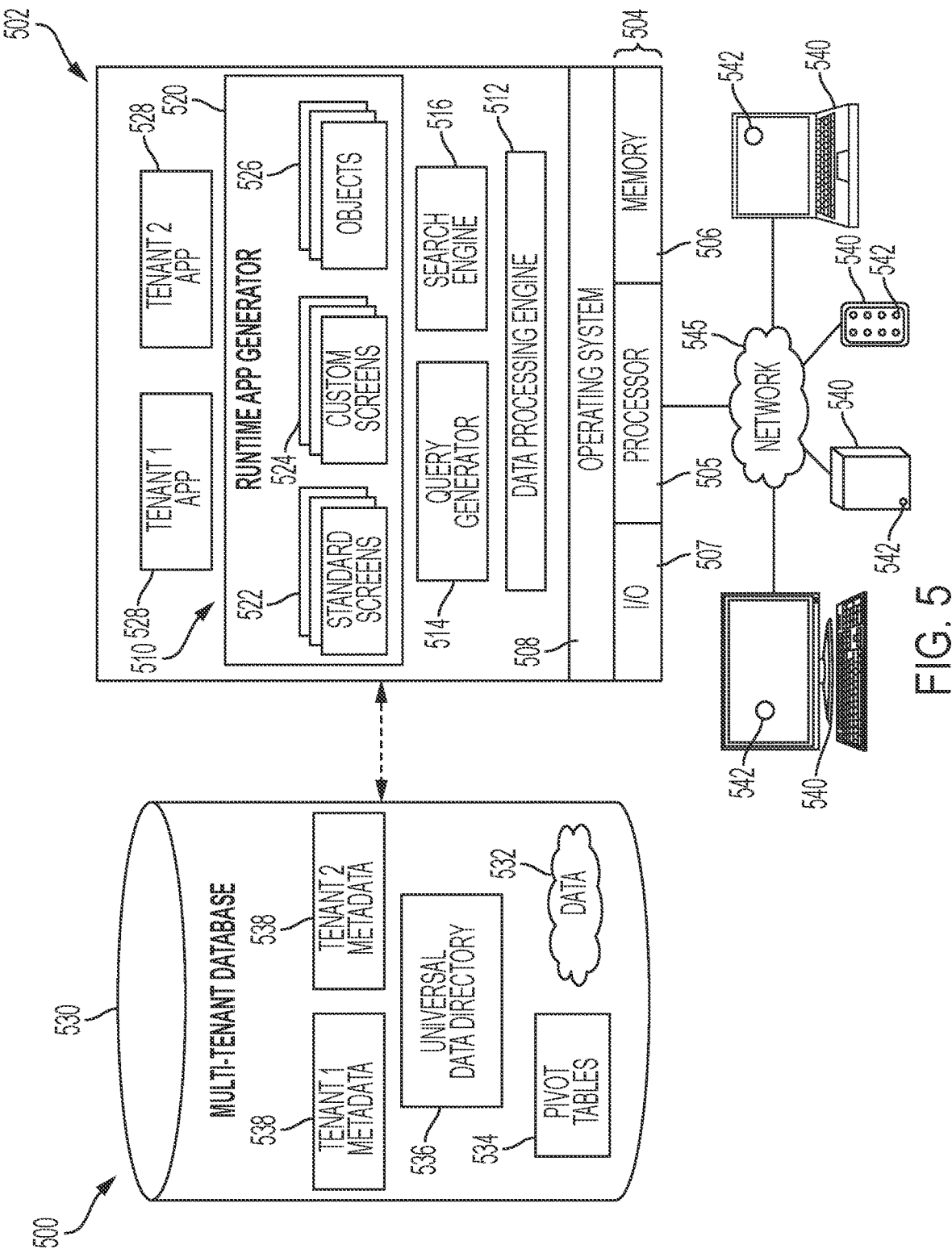
FIG. 5 is a schematic block diagram of an exemplary multi-tenant computing environment in accordance with one embodiment.

Turning now to FIG. 5, an exemplary multi-tenant system 500 includes a server 502 that dynamically creates and supports virtual applications 528 based upon data 532 from a database 530 that may be shared between multiple tenants, referred to herein as a multi-tenant database. Data and services generated by the virtual applications 528 are provided via a network 545 to any number of client devices 540, as desired. Each virtual application 528 is suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. Stated another way, each respective user within the multi-tenant system 500 is associated with, assigned to, or otherwise belongs to a particular one of the plurality of tenants supported by the multi-tenant system 500. Tenants may represent companies, corporate departments, business or legal organizations, and/or any other entities that maintain data for particular sets of users (such as their respective customers) within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality and hardware resources without necessarily sharing any of the data 532 belonging to or otherwise associated with other tenants.

The multi-tenant database 530 may be a repository or other data storage system capable of storing and managing the data 532 associated with any number of tenants. The database 530 may be implemented using conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528, as described in greater detail below. The multi-tenant database 530 may alternatively be referred to herein as an on-demand database, in that the multi-tenant database 530 provides (or is available to provide) data at run-time to on-demand virtual applications 528 generated by the application platform 510, as described in greater detail below.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 may be implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request.

With continued reference to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530, as described in greater detail below. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired. As described in greater detail below, the query generator 514 suitably obtains the requested subsets of data 532 from the database 530 as needed to populate the tables, reports or other features of the particular virtual application 528.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"— As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"— The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with the process may be performed by software, hardware, firmware, or any combination thereof. For illustrative purposes, the description of the process may refer to elements mentioned above. In practice, portions of the process may be performed by different elements of the described system, e.g., component A, component B, or component C. It should be appreciated that process may include any number of additional or alternative tasks, the tasks shown need not be performed in the illustrated order, and the process may be incorporated into a more comprehensive procedure or process having additional functionality not described in detail herein. Moreover, one or more of the tasks could be omitted from an embodiment of the process as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for managing a user's email subscriptions, comprising:

providing a user interface (UI) to the user, where the UI allows the user to view and select multiple components across multiple dashboard displays for an email subscription to an email address;
receiving user's selection, via the UI, to include at least two components from the dashboard displays;
creating a job notification configuration file which contains information parsed from each component that comprises component source, type, dimensions and filters;
saving a snapshot of each dashboard display where a link is stored within each snapshot that includes at least a component link to identify which component should be displayed by each dashboard display; and
combining the at least two selected components into a single email message that is sent to the email address on a predetermined schedule selected by the user.

2. The method of claim 1, where the multiple components comprise key performance indicators (KPI).

3. The method of claim 1, where the multiple components comprise widgets.

4. The method of claim 3, where the widgets comprise charts.

5. The method of claim 3, where the widgets comprise tables.

6. The method of claim 3, where the widgets comprise textual messages.

7. The method of claim 1, where the display is rendered periodically based on a predetermined schedule selected by the user.

8. The method of claim 1, where the single email message is sent based on the user's preference.

9. The method of claim 1, where the user creates multiple separate subscriptions to the email address.

10. The method of claim 1, where the rendering display is a portable document format (PDF) file.

11. An apparatus for managing a user's email subscriptions, comprising:

a processor; and
a memory coupled to the processor, where the memory comprises a computer readable storage media that includes computer program instructions capable of,
providing a user interface (UI) to the user, where the UI allows the user to view and select multiple components across multiple dashboard displays for an email subscription to an email address;
receiving user's selection, via the UI, to include at least two components from the dashboard displays;
creating a job notification configuration file which contains information parsed from each component that comprises component source, type, dimensions and filters;
saving a snapshot of each dashboard display where a link is stored within each snapshot that includes at least a component link to identify which component should be displayed by each dashboard display; and
combining the at least two selected components into a single email message that is sent to the email address on a predetermined schedule selected by the user.

12. The apparatus of claim 11, where the multiple components comprise key performance indicators (KPI).

13. The apparatus of claim 11, where the multiple components comprise widgets.

14. The apparatus of claim 13, where the widgets comprise charts.

15. The apparatus of claim 13, where the widgets comprise tables.

16. The apparatus of claim 13, where the widgets comprise textual messages.

17. The apparatus of claim 11, where the user creates multiple separate subscriptions to the email address.

\* \* \* \* \*